(12) United States Patent
Christian

(10) Patent No.: US 11,148,065 B2
(45) Date of Patent: Oct. 19, 2021

(54) MANUAL TRANSMISSION EMULATOR MODULE FOR RADIO CONTROLLED ELECTRIC VEHICLES

(71) Applicant: Locksley A. Christian, Chandler, AZ (US)

(72) Inventor: Locksley A. Christian, Chandler, AZ (US)

(73) Assignee: Locksley A. Christian, Chandler, AZ (US)

( * ) Notice: Subject to any disclaimer, the term of this patent is extended or adjusted under 35 U.S.C. 154(b) by 135 days.

(21) Appl. No.: 16/739,977

(22) Filed: Jan. 10, 2020

(65) Prior Publication Data

US 2021/0213368 A1    Jul. 15, 2021

(51) Int. Cl.
| | | |
|---|---|---|
| *A63H 30/04* | (2006.01) | |
| *A63H 17/26* | (2006.01) | |
| *F16H 59/04* | (2006.01) | |
| *F16H 59/02* | (2006.01) | |

(52) U.S. Cl.
CPC ............. *A63H 30/04* (2013.01); *A63H 17/26* (2013.01); *F16H 59/044* (2013.01); *F16H 2059/0239* (2013.01)

(58) Field of Classification Search
None
See application file for complete search history.

(56) References Cited

U.S. PATENT DOCUMENTS

| | | | | |
|---|---|---|---|---|
| 5,135,427 A * | 8/1992 | Suto | ........................ | A63H 17/14 180/6.7 |
| 5,680,307 A * | 10/1997 | Issa | ..................... | F16H 59/0204 477/906 |
| 5,707,237 A * | 1/1998 | Takemoto | ............... | A63F 13/08 434/69 |
| 5,875,683 A * | 3/1999 | Yeung | .................... | A63H 17/26 74/473.12 |
| 6,287,167 B1 * | 9/2001 | Kondo | ................... | A63H 17/36 446/454 |
| 6,338,664 B1 * | 1/2002 | Wong | ..................... | A63H 17/12 446/456 |
| 6,893,320 B2 * | 5/2005 | Caiozza | ................. | A63H 30/04 446/454 |
| 7,438,148 B1 * | 10/2008 | Crea | ........................ | B62D 1/24 180/167 |
| 8,049,601 B1 * | 11/2011 | Hofer | ..................... | A63H 30/04 340/13.34 |
| 8,401,860 B1 * | 3/2013 | Evans | ..................... | G10L 15/22 704/275 |
| 8,960,592 B1 * | 2/2015 | Windisch | ............... | A63H 30/04 244/12.5 |
| 9,079,471 B1 * | 7/2015 | Arends | .................. | B60G 17/02 |
| 9,446,325 B2 * | 9/2016 | Kudo | ..................... | A63H 30/04 |

(Continued)

FOREIGN PATENT DOCUMENTS

WO    WO2018/140898    *    8/2018    ............. A63H 30/04

*Primary Examiner* — William Kelleher
*Assistant Examiner* — Gregory T Prather

(57) ABSTRACT

A Radio Controlled vehicle manual gearbox transmission system is presented. A system whereby a user can integrate this standalone manual transmission emulation module into their vehicle, which would increase their enjoyment/engagement in driving said vehicle (by switching to manual throttle range control versus the previous single gear automatic throttle control system). Thus emulating real world racing complexity.

13 Claims, 5 Drawing Sheets

Schematic diagram

(56) References Cited

U.S. PATENT DOCUMENTS

| | | | |
|---|---|---|---|
| 10,518,173 B2* | 12/2019 | Tang | B64C 39/024 |
| 10,525,370 B1* | 1/2020 | Poteet | A63H 30/04 |
| 2003/0114075 A1* | 6/2003 | Moll | A63H 30/04 |
| | | | 446/456 |
| 2003/0236121 A1* | 12/2003 | Byers | F16H 61/16 |
| | | | 463/62 |
| 2007/0293124 A1* | 12/2007 | Smith | A63H 30/00 |
| | | | 446/454 |
| 2007/0293125 A1* | 12/2007 | Jenkins | A63H 30/00 |
| | | | 446/454 |
| 2008/0056516 A1* | 3/2008 | Christian | H04R 1/227 |
| | | | 381/303 |
| 2008/0094199 A1* | 4/2008 | Kazyaka | B60Q 3/283 |
| | | | 340/456 |
| 2008/0285628 A1* | 11/2008 | Gizis | A63H 30/04 |
| | | | 375/135 |
| 2010/0203933 A1* | 8/2010 | Eyzaguirre | A63H 13/10 |
| | | | 463/2 |
| 2013/0234634 A1* | 9/2013 | Hofer | A63H 29/22 |
| | | | 318/400.09 |
| 2013/0244536 A1* | 9/2013 | Chan | A63H 17/395 |
| | | | 446/454 |
| 2014/0235137 A1* | 8/2014 | Allmendinger | A63H 30/04 |
| | | | 446/454 |
| 2015/0015376 A1* | 1/2015 | Jenkins | G08C 17/02 |
| | | | 340/12.5 |
| 2015/0094880 A1* | 4/2015 | Beard | G05D 1/0212 |
| | | | 701/2 |
| 2016/0184722 A1* | 6/2016 | Kathavate | A63H 30/04 |
| | | | 446/465 |

* cited by examiner

Schematic diagram

Wiring Diagram

Servo/Potentiometer Module

Modified wheel Transmitter

MANUAL TRANSMISSION EMULATOR MODULE FOR RADIO CONTROLLED ELECTRIC VEHICLES

CROSS REFERENCE TO RELATED APPLICATIONS

The present Utility Patent Application claims priority benefit of the {US Provisional Application for patent Ser. No. 62/883,805, entitled 'Manual Transmission Emulator Module for Radio Controlled Electric Vehicles' filed on Aug. 7, 2019. The contents of this provisional application are incorporated herein by reference for all purposes.

FIELD OF THE INVENTION

This invention relates, but is not limited, to electric toy vehicles.

BACKGROUND OF THE INVENTION

Problem Solved

My invention solves the problem of a lack of manual transmission input control for Radio Controlled vehicles as is represented in the real world racing series'. Currently, only Automatic transmission functionality is available in the Radio Control community. Adds manual transmission excitement to the genre.

SUMMARY OF INVENTION

This invention relates to Electric Vehicles, in particular, but not limited to, Radio Controlled toy vehicles, whereby a user can integrate this standalone manual transmission emulation module into their vehicle, which would increase their enjoyment/engagement in driving said vehicle (by switching to manual throttle control versus the previous automatic throttle control system).

This invention can also be used in high torque electric vehicles, such as bicycles, where, due to limited throttle range, accidental throttle movement can cause front wheel lift (known as a wheelie) which may cause accidents. Using this invention would suppress the likelihood of wheelies by breaking the maximum throttle range into several lesser throttle ranges which can be selected by simply pressing an up or down button/switch.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTIONS OF DRAWINGS

As stated above, my invention solves the problem of a lack of manual transmission input control for Radio Controlled vehicles as is represented in real world racing. The invention claimed here solves this problem.

Without reinventing current Radio Control technology, my invention is a programmed module, with appropriate interconnects, which is inserted into already existing vehicles to add manual throttle range control functions.

The claimed invention differs from what currently exists. Manual transmission emulation functionality does not currently exist in the Radio Control vehicle community. This invention is an improvement on what currently exists. Manual transmission emulation functionality does not currently exist in the Radio Control vehicle community.

Figure 1:
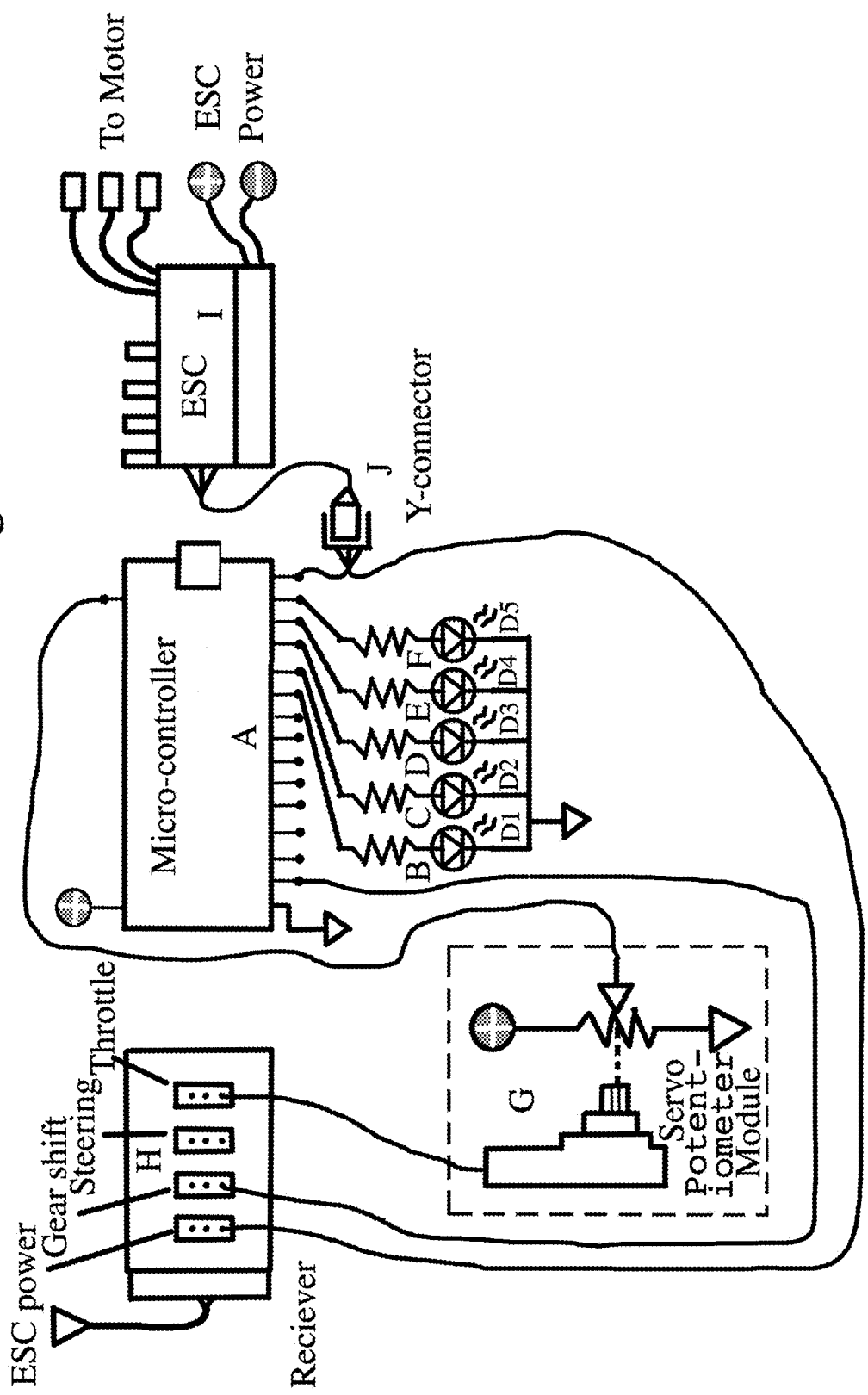
FIG. 1 represents an example schematic diagram based on the use of a specific programmable micro-controller, of which different types can be used and which can all be programmed to carry out the same electrical operations.
Figure 2:
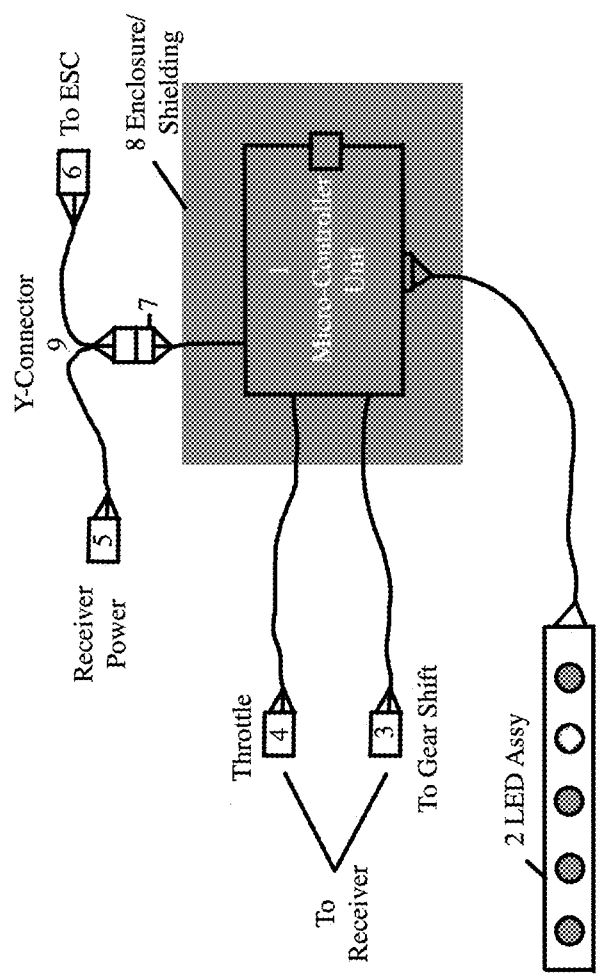
FIG. 2 represents an example of a completed module with appropriate interconnects to interface with a standard Radio Controlled electric vehicle.
Figure 3:
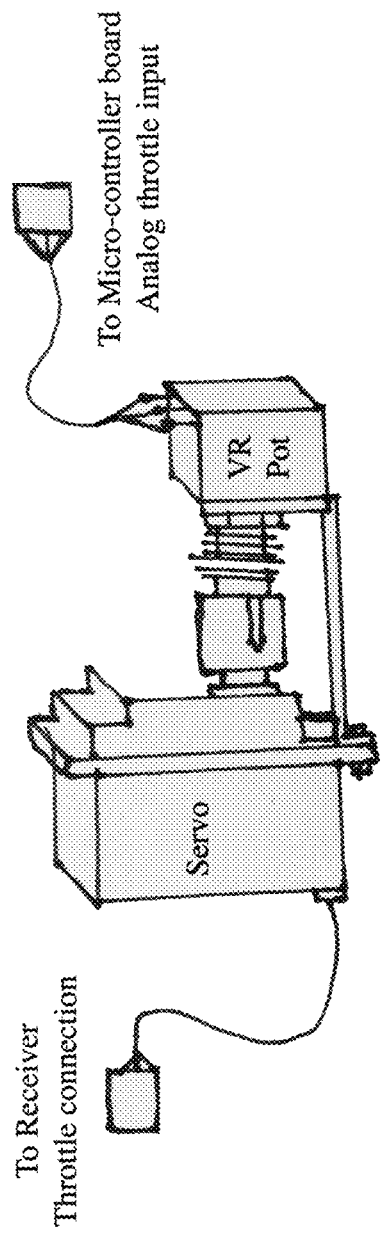
FIG. 3 represents an optional component that can be used to simplify the interfacing of the Receiver unit with the Micro-controller, by converting the digital throttle signal (PCM/PWM) to an analog signal, which allows for simpler software coding to process the throttle signal (dependent on the software/micro-controller used).

The Version of the Invention Discussed Here Includes:
1. Item #1 of FIG. 2; A single board micro-controller—programmed with control software
2. Item #2 of FIG. 2; A circuit board with applicable number of LEDs (light emitting diodes) for displaying which 'gear' is selected.
3. Item #3 of FIG. 2; A standard connector from the micro-controller to the Receiver plug selected for gear shifting use.
4. Item #4 of FIG. 2; A standard connector from the micro-controller to the Throttle plug of the Receiver or the Potentiometer connector of the 'Servo/Potentiometer module' (FIG. 3).
5. Item #7 of FIG. 2; A standard connector from the micro-controller to a 'Y' connector (item #9) which connects to the Receiver' power plug via item #5 and the ESC (electronic speed controller) via item #6.
6. Item #9 of FIG. 2; A standard 'Y' connector which connects the micro-controller to the Receiver' power plug and the ESC (electronic speed controller).
7. Item #8 of FIG. 2; A housing which acts as 'shielding' or an 'insulator' for the micro-controller circuit board.
8. Item #G of FIG. 1; An optional module (also FIG. 3) which converts the digital throttle signal from the Receiver to an analog signal to the micro-controller.

Relationship Between the Components:
A standalone electric power/throttle control module comprising:
A Housing (Item 8 of FIG. 2);
A number of electrical interconnects (Items #3, 4, 7, and 9), with standard connectors to interface with the receiver and Electronic Speed Control unit (ESC) within a Radio Controlled Electric Vehicle;
A micro-controller circuit (Item #1 of FIG. 2) within the housing, coupled to the interconnects, which has been programmed with the different throttle/gear modes;
A number of light indicators (LEDs) (Item #2 of FIG. 2) to indicate which gear/throttle state has been selected;
A programmable micro-controller (Item #1 of FIG. 2), which when connected to the Radio Control receiver" throttle output port (Item #H of FIG. 1), processes the throttle signal based on the programmed map (depending on which "gear" selected) and passing the selected throttle map signal to the vehicles Electronic Speed controller (Item #I of FIG. 1) for vehicle movements;

A programmable micro-controller (Item #A of FIG. 1) which, connected to the Radio Control Receiver' auxiliary channel (Item #H of FIG. 1), selected for gear shifting, processes the "Gear" selection signal sent by the pressing the "Gear-up" or "Gear-down" button/switch on the Transmitter or Control Unit, to determine which throttle map mode the Micro-controller sends to the Electronic Speed Control for forward or reverse vehicle movement.

How the Invention Works:

The present invention is a standalone module that can be incorporated into, but not limited, to existing Radio Controlled electric toy vehicles, to provide additional enjoyment/engagement by adding manual transmission emulation functionality.

Figure 4:
FIG. 4 represents an example Radio Control Transmitter showing typical control interfaces used for controlling RC vehicles. Of note is the throttle control stick (#A FIG. 4) and the Elevator control (#B FIG. 4) which in this case is assigned the gear shift function (up and down).
Figure 5:
FIG. 5 represents another example Radio Control Transmitter, however, now with added gear shift button functionality through the FIG. 5 item #C buttons to accommodate this inventions added functionality.

This invention utilizes a micro-controller which has been programmed to receive the PCM (Pulse Coded Modulation) or similar Throttle signal from the Radio Control receiver (sent by the transmitter) and map the throttle movement into several distinct ranges. These throttle ranges are selected by using an auxiliary receiver channel assigned to a specific control stick/button on the Transmitter (in this example the Elevator control stick of FIG. 4 item #B). By engaging the control button/stick different throttle maps within the program are selected, including (but not limited to) Reverse gear, Neutral, First gear, Second Gear, Third gear, etc. When each gear is selected an assigned LED (Light Emitting Diode) is illuminated (item #2 of FIG. 2).

This invention, in module form, when placed inside the Radio Controlled vehicle, has several connectors that need to be connected to the vehicles existing electrical system. These connectors are; A "Y" connector (#9 of FIG. 2) which connects the modules Servo out connector (#7 of FIG. 2) to the Servo' controller unit (#1 of FIG. 1) and the Receiver' power connector (#5 of FIG. 2—Note: the signal wire needs to be disconnected on this connector to prevent interference); The gear shift connector (#3 of FIG. 2) to the auxiliary channel connector of the Receiver; The Throttle connector (#4 of FIG. 2) to the throttle connector of the Receiver. The throttle connection, in this case, is directed through a digital to analog converter unit, the Servo/Potentiometer unit (FIG. 3), which allows for a simple interface between the micro-controller and the receiver due to limitations with different software programs. Different software may not require this interface. The module also has a lighting array (#2 of FIG. 2) which displays which gear is selected.

How to Make the Invention:

To build my invention, a programmable micro-controller is required that has a operating system or language that allows a programmer to create maps of digital or analog input, output these maps as digital pulse code modulation (PCM) signals to digital outputs using the standard off the shelf connectors used in Radio Control vehicles.

The micro-controller (Item #1 of FIG. 2) and three Servo connectors (Items #3, 4 and 7 of FIG. 2) are necessary.

The Servo to Potentiometer unit (FIG. 3) is optional due to limitations of different programming software.

How to Use the Invention:

The enduser or product manufacturer would disconnect the Electronic Speed Controller' servo connector from the receiver and plug it into the servo out connector (Item #7 of the FIG. 2) of the micro-controller printed circuit board, then plug the throttle out connector (item #4 of FIG. 2) from the micro-controller to the throttle plug of the Receiver unit. Next, plug the gear shift connector (item #3 of FIG. 2) into the designated auxiliary channel of the receiver unit. Once the RC vehicle and transmitter are powered up some control stick trimming may be required for the vehicle to start up in optimal neutral gear position. Pushing the designated gear shift control stick/button of the transmitter will shift through different mapped throttle modes while also allowing a range of throttle within those modes using the throttle controls.

Additionally: This invention manipulates the Pulse Coded Modulated signal used to control some electric vehicles and allows one throttle range to be broken down into several ranges, giving wider control over power of electric vehicles, such as electric Bicycles with high power levels. Adding more than one throttle range would minimize wheelies or tire spin.

The invention claimed is:

1. A micro-controller module for emulating a manual transmission in a radio controlled electric vehicle, the micro-controller module comprising:
    a printed circuit board;
    a plurality of standard electrical interconnects for connecting the printed circuit board to a plurality of standard electric vehicle components in the radio controlled electric vehicle;
    wherein the plurality of standard electric vehicle components of the radio controlled electric vehicle to which the micro-controller module can be connected includes a standard radio control receiver, and a standard Electronic Speed Control (ESC) unit for controlling the speed of a motor in the radio controlled electric vehicle;
    wherein the plurality of standard electrical interconnects includes a throttle input interconnect for connecting the printed circuit board to a throttle output port of the receiver;
    wherein the plurality of standard electrical interconnects includes a gear shift interconnect for connecting the printed circuit board to a gear shift output port of the receiver or to an auxiliary output port of the receiver configured for selecting a gear;
    wherein the plurality of standard electrical interconnects includes a throttle output interconnect for connecting the printed circuit board to a throttle input of the Electronic Speed Control unit;
wherein the radio controlled electric vehicle is controllable wirelessly via a transmitter which can wirelessly communicate with the receiver;
    wherein the printed circuit board is programmed to:
        process a Gear selection signal received by the gear shift interconnect which is triggered by pressing a Gear-up or a Gear-down button/switch on the transmitter;
        select a throttle map mode corresponding to the gear selection signal;
        process a Throttle signal received by the throttle input interconnect; and
        modify the throttle input signal based on a throttle map corresponding to the selected throttle map mode and output a modified throttle signal via the throttle output interconnect to the throttle input of the Electronic Speed Control unit.

2. The micro-controller according to claim 1, wherein:
    the throttle input interconnect is configured to connect the printed circuit board directly to the throttle output port of the receiver.

3. The micro-controller according to claim 1, wherein:
the throttle input interconnect is configured to connect the printed circuit board indirectly to the throttle output port of the receiver via an intermediary potentiometer module which converts a digital throttle signal (PCM/PWM) which is outputted by the throttle output port of the receiver to an analog throttle signal which is received by the printed circuit board.

4. The micro-controller module according to claim 1, further comprising:
a plurality of light indicators; and
wherein the plurality of light indicators indicate the selected throttle map mode.

5. The micro-controller module according to claim 4, wherein:
the plurality of light indicators are light emitting diodes (LEDs).

6. The micro-controller module according to claim 1, further comprising:
a housing; and
wherein the printed circuit board is contained within the housing.

7. A method of assembling the micro-controller module of claim 1 in an existing radio controlled electric vehicle in order to add manual transmission emulation, the method comprising:
disconnecting the Electronic Speed Control unit of the radio controlled electric vehicle from the Receiver;
connecting the throttle output interconnect of the micro-controller module to the Electronic Speed Control unit;
connecting the throttle input interconnect of the micro-controller module of claim 1 to the throttle output port of the Receiver, or connecting the throttle input interconnect of the micro-controller module indirectly to the throttle output port of the receiver via an intermediary potentiometer module which converts a digital throttle signal (PCM/PWM) outputted by the throttle output port of the receiver to an analog throttle signal; and
connecting the gear shift interconnect of the micro-controller module to the gear shift output port of the receiver or to the auxiliary output port of the receiver.

8. A radio controlled electric vehicle which emulates manual transmission shifting, comprising:
a micro-controller module for emulating a manual transmission in the radio controlled electric vehicle, comprising:
a printed circuit board contained within the housing;
a plurality of standard electrical interconnects which connect the printed circuit board to a plurality of standard electric vehicle components in the radio controlled electric vehicle;
wherein the plurality of standard electric vehicle components of the radio controlled electric vehicle to which the micro-controller module is connected includes a standard radio control receiver, and a standard Electronic Speed Control (ESC) unit which controls the speed of a motor in the radio controlled electric vehicle;
wherein the plurality of standard electrical interconnects includes a throttle input interconnect which connects the printed circuit board to a throttle output port of the receiver;
wherein the plurality of standard electrical interconnects includes a gearshift interconnect which connects the printed circuit board to a gearshift output port of the receiver or to an auxiliary output port of the receiver configured for selecting a gear;
wherein the plurality of standard electrical interconnects includes a throttle output interconnect which connects the printed circuit board to a throttle input of the Electronic Speed Control unit;
wherein the radio controlled electric vehicle is controllable wirelessly via a transmitter which can wirelessly communicate with the receiver;
wherein the printed circuit board is programmed to:
process a Gear selection signal received by the gear shift interconnect which is triggered by pressing a Gear-up or a Gear-down button/switch on the transmitter;
select a throttle map mode corresponding to the gear selection signal;
process a Throttle signal received by the throttle input interconnect; and
modify the throttle input signal based on a throttle map corresponding to the selected throttle map mode and output a modified throttle signal via the throttle output interconnect to the throttle input of the Electronic Speed Control unit.

9. The radio controlled electric vehicle of claim 8, wherein:
the throttle input interconnect connects the printed circuit board directly to the throttle output port of the receiver.

10. The radio controlled electric vehicle of claim 8, wherein:
the throttle input interconnect connects the printed circuit board indirectly to the throttle output port of the receiver via an intermediary potentiometer module which converts a digital throttle signal (PCM/PWM) outputted by the throttle output port of the receiver to an analog throttle signal received by the printed circuit board.

11. The radio controlled electric vehicle of claim 8, wherein:
the micro-controller module further comprises a plurality of light indicators; and
wherein the plurality of light indicators indicate the selected throttle map mode.

12. The radio controlled electric vehicle of claim 8, wherein:
the plurality of light indicators are light emitting diodes (LEDs).

13. The radio controlled electric vehicle of claim 8, wherein:
the micro-controller module further comprises a housing; and
wherein the printed circuit board is contained within the housing.

* * * * *